UNITED STATES PATENT OFFICE.

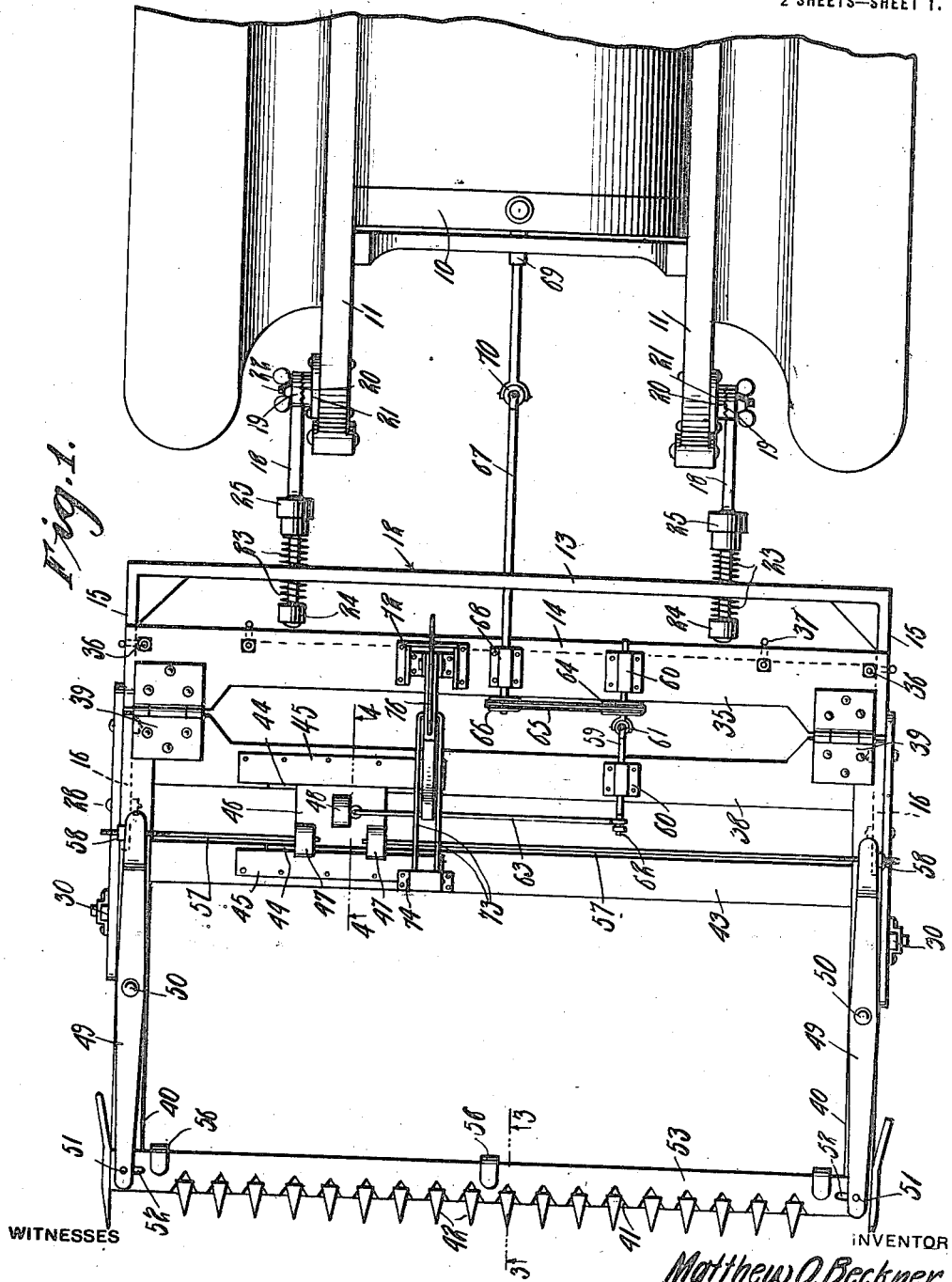

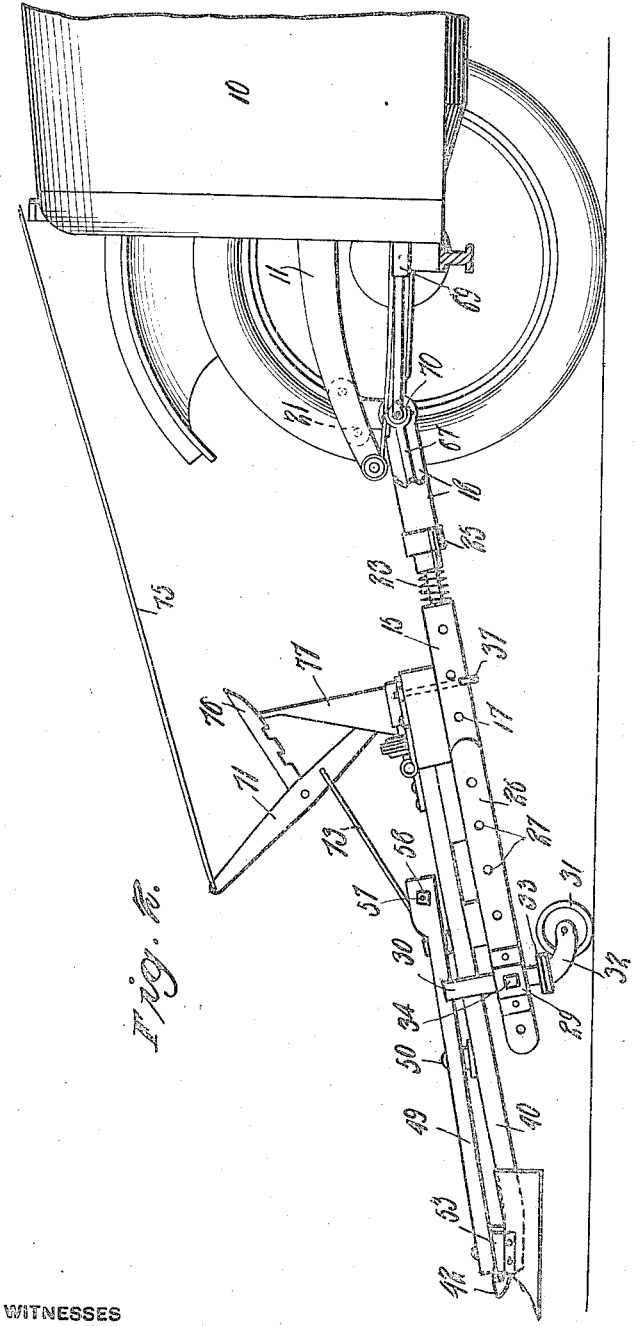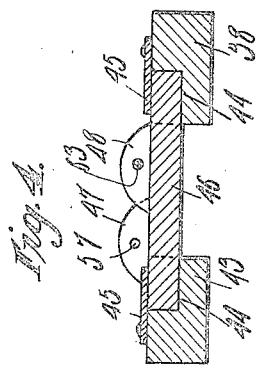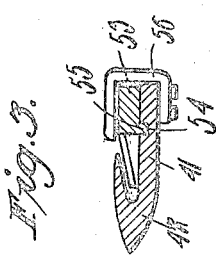

MATTHEW O. BECKNER, OF ROANOKE, VIRGINIA.

MOWER ATTACHMENT.

1,280,373.   Specification of Letters Patent.   Patented Oct. 1, 1918.

Application filed July 11, 1917. Serial No. 179,967.

*To all whom it may concern:*

Be it known that I, MATTHEW O. BECKNER, a citizen of the United States, residing at Roanoke, in the county of Roanoke and State of Virginia, have invented certain new and useful Improvements in Mower Attachments, of which the following is a specification.

This invention has relation to agricultural machines, and the primary object is to provide an attachment for a motor vehicle whereby to support various agricultural machines such as mowers, binders, rakes, drills or the like.

Another object of the invention is to provide an attachment of the character above described embodying means for permitting adjustment thereof to adapt the same to support various machines and to permit vertical adjustment of the attachment toward and away from the ground.

A still further object of the invention is to provide an improved mowing machine designed especially for association with my attachment to a motor vehicle, and embodying means whereby the mower may be driven directly by the prime mover of the vehicle, and means to raise the mower from the ground when the same is not in use or to avoid obstacles in the field.

In addition to the foregoing my invention comprehends improvements in the details of construction, and arrangement of the parts to be hereinafter more fully described and particularly set forth in the appended claims.

In the accompanying drawings in which similar and corresponding parts are designated by the same characters of reference throughout the several views in which they appear:

Figure 1, is a view in plan of my attachment and mowing machine illustrating the same supported upon the forward end of a motor vehicle.

Fig. 2, is a view in side elevation of the devices of the preceding figure.

Fig. 3, is a transverse section taken on the line 3—3 of Fig. 1.

Fig. 4, is a transverse section taken on the line 4—4 of Fig. 1.

With reference to the drawings, 10 indicates the forward portion of a motor vehicle and 11 the projecting ends of the side frame members of the chassis thereof.

My object is to provide primarily an attachment to a motor vehicle whereby the attachment may be utilized to support various articles of machinery for agricultural purposes. Considering the attachment, the same comprises a frame indicated generally at 12 which includes a pair of bars 13 and 14 which are extended transversely of the vehicle in parallelism and in spaced relation and connected at their ends by end bars 15 which project forward beyond the forward bar 14 as indicated at 16. The end bars 15 are each provided with a series of longitudinally spaced perforations 17. The frame is supported from the vehicle by means of rods 18 which extend through openings in the frame bar 13 and which are formed on one of their ends with circular enlargements 19 having their adjacent faces serrated as at 20 for engagement with similar faces of a coacting member 21 which is secured to the side of the frame bar 11 of the vehicle. Bolts 22 penetrate the enlargement and members 21 to secure the coacting members against relative movement subsequent to adjustment. It will thus be seen that the frame 12 is capable of vertical adjustment toward and away from the ground. A pair of coil springs 23 are encircled about the rods 18 and are disposed to bear against the front and rear faces of the bar 13 and at their opposite ends against heads 24 formed on said rods and collars 25, whereby to cushion shocks that may be received by the frame 12 during use thereof. The forward ends of the extensions are secured to extension bars 26 which are formed with apertures 27 whereby bolts 28 may be extended through registering openings 17 and 27 to hold the extension bars to said extensions 16. It will be apparent that the extension bars may be adjusted so as to lengthen or shorten the frame 12 and to thereby adapt the same to the support of various kinds of machinery. The forward ends of the extension bars 16 are provided with sockets 29 to receive the shanks 30 of supporting wheels 31 which are journaled in members 32 swiveled to the lower ends of the shank. A ball bearing connection 33 is provided between the shanks 30 and members 32.

It will be apparent that the forward end of the attachment frame may thus be supported upon the ground, and the attachment may be adjusted vertically relative to the ground, both by means of the roller supports and the jointed connections with the vehicle frame, the brackets 29 having set screws 34 to engage the shanks 30 when the attachment frame is adjusted.

It will be apparent that any agricultural machine may be secured to the attachment frame. For instance, the frame of a wheel supported rake may be readily secured to the attachment frame and the wheels of the rake may be removed as the frame of the rake may be entirely supported by the attachment frame. Similarly, other wheel supported agricultural machines may be bolted to my attachment frame and operated in a satisfactory manner.

I have, however, illustrated a novel form of mower which is designed especially for attachment to my frame and comprises a relatively stationary bar 35 which is extended transversely of the vehicle and is placed upon the attachment frame adjacent the rear end thereof and may be secured thereto by bolts 36 adapted to enter openings in the bar and which are formed with hooked terminals 37 which engage around the end bars 15 and 14 of the attachment frame. A movable frame bar 38 is provided parallel to the bar 35 and hingedly connected thereto at its ends by means of hinges 39. Side bars 40 project forwardly from the ends of the bar 38, and are connected at their forward ends by means of a sickle bar 41 provided with fingers 42. A cross bar 43 is extended between the side bars 40 parallel to the bar 38 and in spaced relation thereto. The upper surfaces of the bars 38 and 43 are formed with recesses 44 which are bridged by means of plates 45 thereby forming a guide for a block 46 which is slidably mounted in the recesses and held against displacement by means of said plates. The block 46 is formed with a pair of upstanding lugs 47, and the central upstanding lug 48.

A pair of levers 49 are fulcrumed as at 50 upon the side bars 40 of the mower frame and are provided upon their forward ends with pins 51 which depend into slots 52 formed in the ends of a cutter bar 53 which is superposed upon the sickle bar. The sickle bar is provided with a longitudinally extending groove 54 in its upper face in which to receive a rib 55 formed on the under side of the cutter bar whereby to insure parallel movement of the cutter bar relative to the sickle bar. The cutter bar is held in place by means of U-shaped clamps 56 which engage over the cutter bar and are secured to the sickle bar. The rear ends of the levers 49 are apertured to receive rods 57 which extend toward each other and have their adjacent ends secured to the upstanding lugs 47 of the sliding block 46. Nuts 58 are engaged upon the threaded terminals of the rods 57 to bear against the outer sides of the levers and to provide for adjustment. A shaft 59 is journaled in bearings 60 secured to the bars 35 and 38 said shaft being formed preferably in sections connected by a universal joint 61 which is located in a plane passing through the center of movement of the hinges which connect said bars 35 and 38. The forward end of the shaft is offset as at 62 to form a crank which is connected by means of a rod 63 with the lug 48 of the sliding block 46. A sprocket wheel 64 is secured to the shaft, and a chain 65 is passed around said sprocket and a sprocket wheel 66 secured to one end of a longitudinally extending shaft 67 journaled at its forward end in a bearing 68 mounted on the bar 35, the other end of the shaft having a socket 69 adapted for engagement with the crank shaft of the engine of the vehicle. A universal joint 70 is located in said shaft and disposed in a plane which passes through the joints which connect the attachment frame to the vehicle frame.

During forward travel of the vehicle the power of the engine thereof is transmitted through the shaft 67 to the shaft 59 by means of the chain and sprocket connection. Rotation of the shaft 59 imparts a reciprocatory movement to the block 46 which is communicated to the levers 49, oscillating the same so as to reciprocate the cutter bar 53 back and forth. It will be noted that in either direction of reciprocation of the cutter bar the strain thereon is tensional and not compression as in the case of means heretofore provided for reciprocation of cutter bars, thereby preventing buckling of the cutter bar. The nuts 58 may be tightened so as to place the cutter bar under strain by reason of the levers acting to pull upon the cutter bar in opposite directions thereby forming a parallelogram defined by the cutter bar, the levers 49 and the rods 57.

The mower frame may be adjusted vertically or raised upon the hinges 39 by means of a lever 71 which is fulcrumed at one end in a bracket 72 mounted on the bar 35, the lever being connected by means of a pair of links 73 to a bracket 74 mounted on the cross bar 43. A rod 75 may be extended rearward from the lever to a point adjacent the driver's seat and connected to a lever whereby said lever 71 may be moved to raise or lower the mower frame. To retain the mower frame in raised position a ratchet bar 76 is pivotally connected to the lever 71 for engagement with a vertical extension 77 of the bracket 72.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a motor vehicle the combination of an attachment including a frame, means pivotally connecting the frame to the forward ends of the side frame members of the chassis of the vehicle, extension bars adjustably connected to the frame for adjustment in a forward or rearward direction, and wheels mounted on said extensions to support the frame upon the ground.

2. In a motor vehicle the combination of an attachment including a frame, rearwardly extending bars mounted in the frame, means pivotally connecting the rear ends of said bars to the forward end of the side frame members of the vehicle chassis, extension bars adjustably connected to the frame for adjustment in a forward or rearward direction, and supporting means for the forward end of the frame including brackets secured to the extensions, standards for engagement in the brackets, rollers mounted in the standards and means on the brackets for engaging the standards to retain the same in adjusted position, thereby permitting vertical adjustment of the frame toward and away from the ground.

3. An attachment to motor vehicles, including a frame, a pair of parallel bars mounted for sliding movement therein, a pair of coil springs encircling each bar to engage opposite sides of the frame to resist movement of the bars relatively to the frame in either direction, enlargements on the free terminals of the bars having serrated faces, and members adapted for attachment to the frame bars of the chassis of the vehicle having serrated faces for coaction with the faces of the enlargement, and means for securing said enlargements to the serrated members to permit vertical adjustment of the frame and to retain the frame in adjusted position.

4. An attachment to motor vehicles, including a frame, means for pivotally connecting the frame to the vehicle for vertical adjustment, a bar mounted upon the frame, means for releasably connecting the bar to the frame, a second bar, means for hingedly connecting the second bar to the first, a frame mounted on the second bar, extension bars carried by the second mentioned frame, for adjustment to vary the length of the frame, and an agricultural machine attachment mounted between said extension bars.

In testimony whereof I affix my signature in presence of two witnesses.

MATTHEW O. BECKNER.

Witnesses:
M. E. JONES,
WM. ZEAMAN.